1

3,341,582
NOVEL BORON SALTS
Stanley Frank Stafiej, Springdale, and Edward Andrew Takacs, South Norwalk, Conn., assignors to American Cyanamid Company, Stamford, Conn., a corporation of Maine
No Drawing. Filed Mar. 9, 1964, Ser. No. 351,584
4 Claims. (Cl. 260—551)

This invention relates to a novel method for the preparation of a particular class of boron-containing cations and to the novel boron-containing salts produced thereby. In its broadest aspects, the method of the present invention comprises reacting, under anhydrous conditions, a boron-containing cation containing at least one nitrile ligand with an alcohol or a mercaptan. This invention also comprises the products of such reaction.

This reaction may be represented by the following equation:

I. 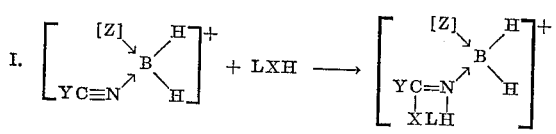

wherein [Z] represents a ligand selected from the group consisting of tertiary amines in which the nitrogen atom is bonded only to carbon atoms of hydrocarbon or substituted hydrocarbon radicals, nitriles, dialkyl sulphides, and tertiary phosphines in which the phosphorus is bonded only to carbon atoms of hydrocarbon or substituted hydrocarbon radicals; wherein Y represents a hydrocarbon or substituted hydrocarbon group; X represents —O— or —S—; and L represents a hydrocarbon or substituted hydrocarbon radical.

The alcohol or mercaptan, LXH, of Equation I may be aliphatic or aromatic, or substituted forms thereof. For example, the alcohol or mercaptan may be methanol, ethanol, propanol, phenol, naphthol, glycol, glycerol, the mercaptan equivalents of the foregoing alcohols, and substituted forms thereof, such as the chloro-, bromo-, nitro-, etc. substituted compounds.

The boron-containing cation may have associated with it any anion which will not interfere with the above reaction, such as the chloride, bromide, fluoride, nitrate, chlorate, sulphate, chloroplatinate, triiodide, hexafluorometaantimoniate, tetraphenylborate, tetrachloroborate, and fluophosphate anions, although it is generally preferred that the anion be the fluoroborate or perchlorate anion since the fluoroborate and perchlorate of this cation can be prepared directly from readily available starting materials by the processes described and claimed in copending applications Ser. Nos. 351,583 and 351,582, filed concurrently herewith by Stafiej and Takacs, and Stafiej and Carvalho, respectively, and assigned to the assignee of the present application now Patent Nos. 3,305,555 and 3,296,274, respectively.

Since the product cation produced by the process of Equation I is associated with the anion originally associated with the starting boron-containing cation, a preferred class of the resultant salt can be written as Ia. 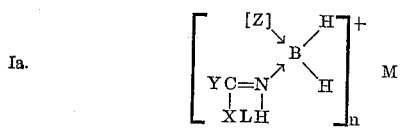

wherein M is selected from the group consisting of Cl⁻, Br⁻, F⁻, NO₃⁻, ClO₃⁻, SO₄⁼, PtCl₆⁼, I₃⁻, SbF₆⁻, (C₆H₅)₄B⁻, BCl₄⁻, PF₆⁻, BF₄⁻, and ClO₄⁻; $n$ is a positive integer equal to the valence of the anion M; and

2 wherein [Z], Y, X, and L have the meanings previously given.

In the boron-containing cation useful for the process of the present invention, it is essential for the present reaction that at least one of the ligands attached to the central boron atom of the cation be a nitrile-containing ligand. In Equation I, this ligand is represented as YC≡N— wherein Y represents a hydrocarbon or substituted hydrocarbon group. Illustrative of the moieties represented by Y are methyl, ethyl, propyl, butyl, N≡C—, N≡C—CH₂—, N≡C—CH₂—CH₂—, etc.

The nucleophile or ligand, [Z], may be any of the ligands described in the aforesaid copending applications Serial Nos. 351,583 and 351,582. Thus, the nucleophile or ligand, [Z] may be a tertiary amine in which the nitrogen atom is bonded only to carbon atoms of hydrocarbon or substituted hydrocarbon radicals. The tertiary amine may have the formula II. 

wherein R₁, R₂, and R₃ are the same or different hydrocarbon radicals or substituted hydrocarbon radicals. For example, they may be lower alkyl (e.g., methyl, ethyl, n-propyl, isopropyl, butyl, etc.), aryl (e.g., phenyl, biphenyl, naphthyl, etc.), aralkyl (e.g., benzyl, xylyl, etc.), alkaryl (e.g., tolyl, dimethyl-phenyl, ethyl-phenyl, cumenyl, etc.) or substituted forms thereof (e.g., containing one or more halogen, alkoxy, ester, thioether, etc. groups). Also, the tertiary amine may have the formula III. 

wherein R₄ and R₅ are hydrocarbon radicals or substituted hydrocarbon radicals. For example, R₄ may be the same as previously described for R₁, R₂, and R₃ and R₅ may be a bivalent radical which, when joined to the nitrogen atom by both valences, forms a heterocyclic ring (e.g., pyrrole, pyrrolidine, pyrroline, piperazine, piperidine, pipecoline, etc.). Further, the tertiary amine may have the formula IV. 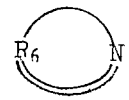

wherein R₆ is a hydrocarbon radical or substituted hydrocarbon radical which, in conjunction with the nitrogen atom, forms a heterocyclic ring (e.g., pyridine, naphthyridine, quinoline, pyrimidine, bipyridyl, etc.). Additionally, the tertiary amine may be a hydrazine derivative having the formula V. 

wherein R₇ and R₈ may be the same as R₁, R₂, or R₃ above.

Also, the ligand can be any of the various nitriles, e.g., lower alkylnitriles (acetonitrile, propionitrile, butyronitrile, etc.), cyanogen, lower alkylene dinitriles (malononitrile, succinonitrile, glutaronitrile, etc.). Further, the ligand can be a dialkyl sulfide, e.g., dimethyl sulfide, ethyl methyl sulfide, diethyl sulfide, substituted forms of the foregoing, etc.

Additionally, the ligand can be a tertiary phosphine in which the phosphorus atom is bonded only to carbon atoms of hydrocarbon or substituted hydrocarbon radicals and which may have any of the formulae

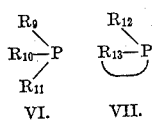 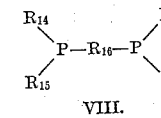 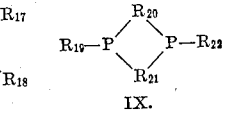

VI.   VII.   VIII.   IX.

wherein $R_9$, $R_{10}$, $R_{11}$, $R_{12}$, $R_{14}$, $R_{15}$, $R_{17}$, $R_{18}$, $R_{19}$, and $R_{22}$, are monovalent hydrocarbon radicals which may be the same or different in any given formula and $R_{13}$, $R_{16}$, $R_{20}$, and $R_{21}$ are bivalent hydrocarbon radicals. These monovalent hydrocarbon radicals may be any of those previously described for $R_1$, $R_2$, or $R_3$ of Formula II. The bivalent hydrocarbon radical $R_{13}$ can be any one which, when joined to the phosphorus atom by both valences, forms a heterocyclic ring (e.g., tetramethylene, pentamethylene, $$-CH_2-CH_2-O-CH_2-CH_2-$$
$$-CH_2-CH_2-C_6H_4(1,2)-CH_2-$$

etc.). The bivalent hydrocarbon radicals $R_{16}$, $R_{20}$, and $R_{21}$ may be lower bivalent alkyl groups (e.g., methylene, ethylene, propylene, butylene, etc.) and, preferably, $R_{20}$ and $R_{21}$ together with the two phosphorus atoms of formula IX should add up to a five or six atom heterocyclic ring for maximum stability. $R_{16}$ may also be a bivalent aryl, alkaryl, or aralkyl group (e.g., o-phenylene, m-phenylene, p-phenylene, o-xylylene, m-xylylene, p-xylylene, toluylene, naphthylene, etc.). Illustrative of ligands useful in the process of this invention are the following:

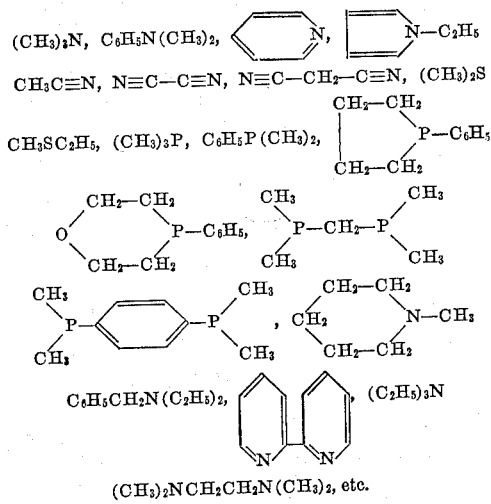

All of the foregoing nucleophiles or ligands have been listed in their simplest forms, but substituted forms thereof may also be used. Thus, they may contain fluorine, chlorine, bromine, or iodine atoms, ether linkages, ester linkages, alkoxy groups, thioether linkages, and other substituents attached thereto provided they do not adversely affect the desired reaction. Also, they may include additional nucleophilic portions providing a plurality of positions to which boron atoms can be secured by ligand linkages.

The boron-containing cations having at least one nitrile-containing ligand may be prepared from readily available starting materials in accordance with the teachings of the aforesaid copending applications Ser. Nos. 351,583 and 351,582.

In application Serial No. 351,583, one method for preparing the boron-containing cations shown on the left side of Equation I above is taught wherein a tertiary amine-borane is reacted, under anhydrous conditions, with a trityl salt and a nucleophile or ligand. For preparing the boron-containing cation having a nitrile ligand secured to the central boron atom (which is the starting material for the reaction of the present invention) one following the teachings of application Ser. No. 351,583 would utilize as the nucleophile or ligand one of the various nitriles mentioned therein. By so doing, the boron-containing cation produced will contain a single ligand having at least one nitrile group therein.

In copending application Ser. No. 351,582, a different process is taught for preparing boron-containing cations useful as starting materials for the reaction of the present invention. In copending application Ser. No. 351,582 boron-containing cations are produced by reacting, under anhydrous conditions, a borohydride salt with at least two equivalents of a trityl salt and at least two equivalents of a ligand. In order to produce boron-containing cations having a nitrile-containing ligand bonded to the central boron atom, it is necessary that the nucleophile or ligand selected be one of the various nitriles mentioned in that application. Accordingly, boron-containing cations are produced which contain two ligands bonded to the central boron atom, each of which contains at least one nitrile group.

It is usually preferred to perform the reaction of this invention in the presence of an inert solvent, or an excess of the alcohol or mercaptan used in the reaction. It is preferred that the foregoing reaction be performed under anhydrous conditions since the presence of moisture interferes with the proper performance of this reaction and serves to greatly reduce the yields of the desired products.

The reaction occurs easily and rapidly at atmospheric pressure and at room temperature or below merely upon mixing the various ingredients together. However, higher or lower pressures and higher or lower temperatues may be used as may be desired. For example, this reaction can be performed at pressures of from about 100 mm. Hg to about five atmospheres and at temperatures of from about $-78°$ C. to about $+100°$ C.

The two reactants may be used in stoichiometrical proportions (i.e., one equivalent of boron-containing cation for each equivalent of alcohol or mercaptan) or an excess (e.g., 0.1 to about 1,000 mole percent or more) of alcohol or mercaptan may be used.

It will be noted that the foregoing reaction (Equation I) of the present invention involves partial saturation of the triple bond of the nitrile group to a double bond by the addition to the nitrogen atom of the hydrogen of the alcohol or mercaptan and the addition to the nitrile carbon of the remainder of the alcohol or mercaptan. Where the boron-containing cation which is the starting material for the present reaction contains two nitrile-containing ligands, one or both of these ligands may have their nitrile groups attacked by the alcohol or mercaptan. Also, some alcohols and mercaptans may have more than one —OH or —SH groups and, consequently, may serve to attack more than one nitrile groups of the boron-containing cations. Thus, when using boron-containing cations having both ligands formed from nitriles and using polyhydroxy alcohols or thio equivalents (e.g., glycols and dithiols), it is possible to build up polymeric chains by the reaction of the present invention.

Examples of the products of the present invention are:

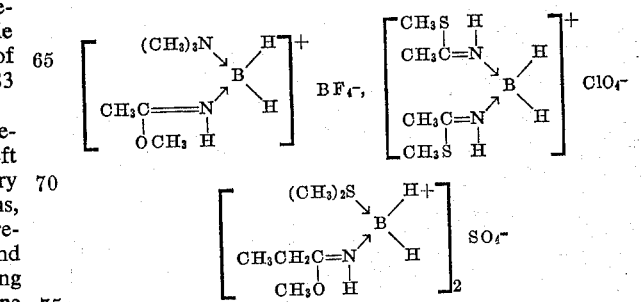

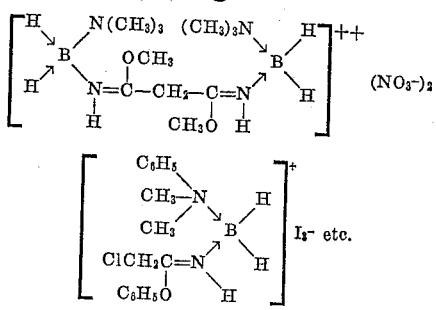

The compounds of this invention are useful as high energy solid rocket propellant ingredients, burning rate modifiers for rocket propellants, and as intermediates for the preparation of other compounds having useful properties, such as by metathesis with compounds having suitable high boron-containing anions to yield high boron-containing compounds for use as fuels for rocket propulsion.

For a clearer and more detailed understanding of the nature of the present invention reference may be had to the following examples which are intended as illustrative only and not as limitations on the invention. In the following examples all parts are by weight unless otherwise noted.

EXAMPLE 1

Preparation of

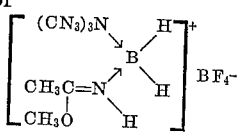

Trimethylamine-acetonitrile - dihydridoboron fluoroborate (0.6 gram; 3 mmoles) was dissolved in 25 ml. of absolute methanol. Cooling the solution to $-78°$ C. caused the precipitation of a white crystalline solid which was filtered off and washed with two 10 ml. portions of dry benzene. 0.3 gram trimethylamine-methyl acetimidate-dihydridoboron fluoroborate (43% yield) was recovered and found to have a melting point of $128-130°$ C., to be an air-stable white crystalline solid, and to be soluble in polar solvents. Two recrystallizations from methanol furnished an analytical sample.

*Analysis.*—Calc'd for $C_6H_{18}N_2B_2F_4O$: C, 31.08; H, 7.82; N, 12.08. Found: C, 31.23; H, 7.43; N, 12.01.

The product structure was further confirmed by infrared spectroscopy which showed the disappearance of $-C\equiv N$ absorption and the appearance of new NH and $>=N-$ absorptions in the infrared spectrum.

EXAMPLE 2

In the manner of Example 1, the folowing reactions occur:

Trimethylphosphine-acetonitrile - dihydrodoboron nitrate reacts with ethyl mercaptan to produce

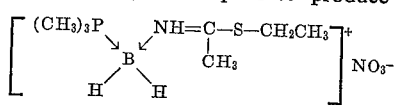

Bis-acetonitrile-dihydridoboron fluoroborate reacts with ethanol to produce

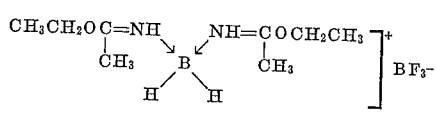

Trimethylamine-acetonitrile - dihydridoboron chloride reacts with ethylene glycol to produce

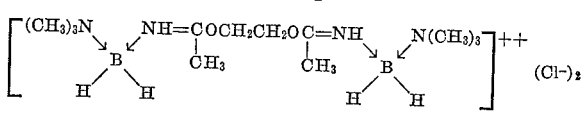

Pyridine-propionitrile - dihydridoboron perchlorate reacts with phenol to produce

[structure shown with ClO4- counterion]

We claim:
1. A salt of

$$\left[\begin{array}{c}[Z]\\ \diagdown\\ [Q]\end{array}B\begin{array}{c}H\\ \diagup\\ H\end{array}\right]^+$$

wherein [Q] is a ligand having the structure $$NH=C\begin{array}{c}XL\\ \diagdown\\ Y\end{array}$$

wherein X is selected from the group consisting of oxygen and sulfur, L is selected from the group consisting of a lower alkyl radical and an aryl radical having from 6-12 carbon atoms, inclusive, and Y is selected from the group consisting of a lower alkyl radical and a nitrile or chloro substituted lower alkyl radical and wherein [Z] is a ligand selected from the group consisting of (1) a tertiary amine free of aliphatic unsaturation, (2) [Q], as previously defined, (3) a hydrazine having the formula $$\begin{array}{c}R_7\\ \diagdown\\ R_8-N\\ \diagup\\ H_2N\end{array}$$

wherein $R_7$ and $R_8$ are each an organic substituent free of aliphatic unsaturation and (4) a tertiary phosphine free of aliphatic unsaturation.

2. A salt of $$\left[\begin{array}{c}(CH_3)_3N\\ \diagdown\\ CH_3C=N\\ |\\ CH_3O\end{array}B\begin{array}{c}H\\ \diagup\\ H\end{array}\right]^+$$

3. A compound having the formula $$\left[\begin{array}{c}[Z]\\ \diagdown\\ [Q]\end{array}B\begin{array}{c}H\\ \diagup\\ H\end{array}\right]_n M$$

wherein $n$ is a positive integer equal to the valence of M, M is an anion selected from the group consisting of $Cl^-$, $Br^-$, $F^-$, $NO_3^-$, $ClO_3^-$, $SO_4^=$, $PtCl_6^=$, $I_3^-$, $SbF_6^-$, $(C_6H_5)_4B^-$, $BCl_4^-$, $PF_6^-$, $BF_4^-$ and $ClO_4^-$; [Q] is a ligand having the structure $$NH=C\begin{array}{c}XL\\ \diagdown\\ Y\end{array}$$

wherein X is selected from the group consisting of oxygen and sulfur, L is selected from the group consisting of a lower alkyl radical and an aryl radical having from 6-12 carbon atoms, inclusive, and Y is selected from the group consisting of a lower alkyl radical and a nitrile or chloro substituted lower alkyl radical and wherein [Z] is a ligand selected from the group consisting of (1) a tertiary amine free of aliphatic unsaturation, (2) [Q], as previously defined, (3) a hydrazine having the formula $$\begin{array}{c}R_7\\ \diagdown\\ R_8-N\\ \diagup\\ H_2N\end{array}$$

wherein $R_7$ and $R_8$ are each an organic substituent free of aliphatic unsaturation and (4) a tertiary phosphine free of aliphatic unsaturation.
4. 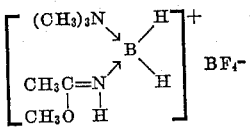
References Cited
Degering, An Outline of Organic Nitrogen Compounds, p. 506 (1560) and 538 (1713), (1950).
Noller, Chemistry of Organic Compounds, 2nd Ed., p. 238 (1957).
WALTER A. MODANCE, *Primary Examiner.*
H. I. MOATZ, *Assistant Examiner.*

UNITED STATES PATENT OFFICE
CERTIFICATE OF CORRECTION

Patent No. 3,341,582                                      September 12, 1967

Stanley Frank Stafiej et al.

It is hereby certified that error appears in the above numbered patent requiring correction and that the said Letters Patent should read as corrected below.

Column 5, lines 1 to 5, for that portion of the formula reading:

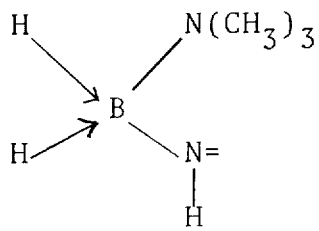        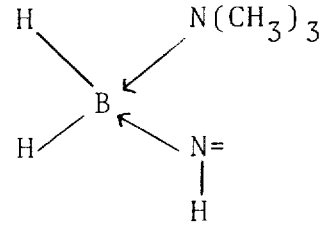

same column 5, lines 65 to 68, for that portion of the formula reading "$BF_3^-$" read -- $BF_4^-$ --; column 6, line 54, for $PtCl^=$                    read                  $PtCl_6^=$ Signed and sealed this 10th day of December 1968.

(SEAL)
Attest:

EDWARD M. FLETCHER, JR.                  EDWARD J. BRENNER
Attesting Officer                           Commissioner of Patents